United States Patent [19]

Gordon

[11] Patent Number: 4,997,478
[45] Date of Patent: Mar. 5, 1991

[54] SILICONE AUTOMOBILE FINISH PROTECTANT

[75] Inventor: Norman Gordon, Skokie, Ill.

[73] Assignee: Blue Chip Stamps, City of Commerce, Calif.

[21] Appl. No.: 439,826

[22] Filed: Nov. 21, 1989

[51] Int. Cl.$^5$ .............................................. C09G 1/08
[52] U.S. Cl. ........................................ 106/3; 106/10
[58] Field of Search ..................................... 106/3, 10

[56] References Cited

U.S. PATENT DOCUMENTS

| | | |
|---|---|---|
| 2,523,281 | 9/1950 | Currie . |
| 3,175,921 | 3/1965 | Hedlund . |
| 3,222,201 | 12/1965 | Boyle et al. . |
| 3,508,933 | 4/1970 | Yates . |
| 3,836,371 | 9/1974 | Kokoszka . |
| 3,847,622 | 11/1974 | Brandl et al. ........................ 106/10 |
| 3,890,271 | 6/1975 | Kokoszka . |
| 4,013,475 | 3/1977 | Liebowitz et al. .................... 106/10 |
| 4,246,029 | 1/1981 | Sanders, Jr. ............................ 106/3 |
| 4,509,981 | 4/1985 | Sanders, Jr. et al. .................... 106/3 |
| 4,600,436 | 7/1986 | Traver et al. .......................... 106/3 |

FOREIGN PATENT DOCUMENTS 1031485  5/1978  Canada .

OTHER PUBLICATIONS

Dow Corning brochure, "Information About Silicone Polish Ingredients" Bulletin 22-264 (3/74).
Dow Corning brochure, "Information About Polish Ingredients", Form No. 22-240A (1978).
Dow Corning brochure, "A Guide to Dow Corning Silicones for Polish Formulators"(1979).
Dow Corning brochure, Information About an Experimental Product: "Dow Corning F-1-0280 Fluid" (Dec. 1965).
TH. Goldschmidt brochure, "Silicone EL 49" (No date).
TH. Goldschmidt brochure, "Tegosivin 200 L 49" (No date).
SWS Silicones Corporation brochures: Silicone Fluid F-756, Silicone Fluid F-770, Silicone Fluid F-784, and Silicone Fluid F-785.
Todd, Charles W., "Silicones in Waxes and Polishes," *Detergent Age*, Jan., 1967 (reprinted for Dow Corning).
Dow Corning brochure, Kokoszka, John G., "Detergent Resistant Auto Polishes" (May 22, 1968).
Herring, Desmond, "Phosphorus, Silicon, Boron and Fluorine in Surfactants," *Manufacturing Chemist and Aerosol News*, (May 1979).

*Primary Examiner*—William R. Dixon, Jr.
*Assistant Examiner*—Deborah Jones
*Attorney, Agent, or Firm*—Marshall, O'Toole, Gerstein, Murray & Bicknell

[57] ABSTRACT

The invention comprehends a silicone emulsion composition containing a nonionic polydimethyl siloxane emulsion, a cationic amodimethicone emulsion, and a cationic aminofunctional silicone emulsion. When the silicone composition is sprayed onto a painted metal surface and wiped with an absorbent cloth, a protective, high-gloss, substantive protective layer of silicone is deposited on the surface.

8 Claims, No Drawings

SILICONE AUTOMOBILE FINISH PROTECTANT

BACKGROUND OF THE INVENTION

1. Field of the Invention

The invention relates generally to an automobile finish coating and more specifically to a silicone automobile finish protectant which provides a high-gloss, substantive, protective layer on exterior painted metal surfaces.

2. Related Technology

High-gloss, protective coatings for automobile finishes have traditionally involved the application of a wax to the exterior surface followed by buffing the applied wax. A wide variety of suitable hydrocarbon or vegetable-based waxes formulated with various additives are commercially available.

Nearly all waxes, however, are difficult to apply uniformly and require extensive buffing to provide a high gloss or shine.

Other available automobile finish products restore or improve automobile finishes which have experienced some deterioration due to wear and oxidative breakdown. Conventional products used for this purpose typically incorporate abrasive materials or tracers in the finish formulation. These materials typically remove or abrade some of the worn or oxidized finish to regenerate the shiny appearance of a newly painted surface.

Modern automotive painting techniques, however, are not compatible with abrasive products. In modern finishes, a relatively thin pigmented or color layer is applied underneath a relatively thick clear layer. This clear coating process is particularly vulnerable to abrasive formulations because once the coating layer is damaged or worn away, there is only a very thin layer of pigmented finish remaining on the surface. Further, should the clear coating wear away unevenly, entire sections of the automobile must be completely refinished to provide a uniform finish.

There exists a need for a nonabrasive, readily applicable automobile finish product which provides a high-gloss, protective coating without the need for extensive buffing and polishing. In addition, the protective coating should be nontoxic and environmentally inert. Further, the protective coating should be easy to apply, should be uniformly distributed or self-leveling over the finished surface, and should be relatively long-lasting.

SUMMARY OF THE INVENTION

It is an object of this invention to overcome one or more of the problems described above.

The invention comprehends an aqueous silicone automobile finish protectant composition containing (a) a nonionic polydimethylsiloxane/polyoxyethylene nonylphenol emulsion; (b) a cationic amodimethicone/cetyl-stearyl dimethyl ammonium chloride emulsion; and (c) an aminofunctional silicone/stearyl dimethylbenzyl ammonium chloride emulsion, all within relatively narrow concentration ranges. Preferably, the composition also contains an amount of p-aminobenzoic acid in an amount effective to absorb ultraviolet radiation.

This composition provides a self-leveling, readily dispersible emulsion which provides a high-gloss, thin protective silicone layer when applied to painted metal surfaces.

When the composition is sprayed through a nozzle onto a surface as a fine mist or aerosol, the emulsion is readily distributed by wiping the emulsion across the surface with an absorbent cloth. As the water is absorbed and removed by the wiping action, the silicones of the composition are deposited from the solution to generate a nonstreaking, substantive protective layer on the finished surface.

The invention further comprehends a method of protecting an automobile finish using the inventive protectant composition.

Other objects and advantages of this invention will be apparent to those skilled in the art from a review of the following detailed description taken in conjunction with the appended claims.

DETAILED DESCRIPTION

The invention relates to an aqueous automobile finish protectant containing nonionic and cationic silicone emulsions. The nonionic emulsion is a polydimethylsiloxane/polyoxyethylene nonylphenol emulsion. The cationic emulsions include an amodimethicone/cetyl-stearyl dimethyl ammonium chloride emulsion and an aminofunctional silicone/stearyl dimethylbenzyl ammonium chloride emulsion.

A preferred composition contains (a) about 1–2 vol. % of a nonionic polydimethylsiloxane/polyoxyethylene nonylphenol emulsion having about a 30–40 wt.% total solids content; (b) about 0.3–0.375 vol.% of a cationic amodimethicone/cetyl-stearyl dimethyl ammonium chloride emulsion having about a 15–25 wt.% total solids content; and (c) about 0.3–0.35 vol. % of an aminofunctional silicone/stearyl dimethylbenzyl ammonium chloride emulsion having about a 15–25 wt. % total solids content, with the balance water. Preferably, the composition also contains p-aminobenzoic acid in an amount effective to absorb ultraviolet radiation.

A more preferred composition contains (a) about 2 vol. % of a nonionic polydimethylsiloxane/ polyoxyethylene nonylphenol emulsion having about a 35 wt. % total solids content; (b) about 0.33 vol. % of a cationic amodimethicone/cetyl-stearyl dimethyl ammonium chloride emulsion having about a 20 wt. % total solids content; (c) about 0.33 vol. % of an aminofunctional silicone/stearyl dimethylbenzyl ammonium chloride emulsion having about a 20 wt. % total solids content; and, (d) about 0.2 vol. % p-aminobenzoic acid; with the balance water.

The nonionic polydimethylsiloxane emulsion provides the major ingredient (other than water) of the composition. A preferred nonionic polydimethylsiloxane for use in the invention is marketed under the trade designation Masil EM 350 by Mazer Chemicals, Gurnee, Ill., as a 35% solids emulsion of polydimethylsiloxane fluid with a viscosity of 350 centistokes. The nonionic emulsion may be diluted with water and is nontoxic.

The cationic emulsion of amodimethicone/cetylstearyl dimethylbenzyl ammonium chloride provides the composition with cationic characteristics necessary to form a substantive, thin layer or film on the surface of the finish. This cationic emulsion is believed to assist in forming a desired substantive, monomolecular layer of the silicone on the surface through favorable electrostatic interactions with the underlying anionic metal. Although the exact character of the electrostatic interaction has not been extensively researched, existing data suggest the cationic emulsion substantively interacts with the anionic metal to produce an evenly distributed monomolecular layer of silicone. The electrostatic interactions are believed to cause the silicone to effectively adhere or bond to the surface and allow excess material and water to be readily wiped away with an absorbent cloth. As used herein, the term "substantive" refers to a silicone layer adhered or bonded to a painted metal surface primarily through electrostatic interactions. A preferred cationic silicone emulsion for use in this invention is marketed under the trade designation Masil EM 115 by Mazer Chemicals, Gurnee, Ill., as an emulsion having a total solids content of about 20 wt. %.

The cationic aminofunctional silicone emulsion enhances both the emulsion stability and the leveling or surface distribution properties of the composition. A preferred aminofunctional silicone is sold by Dow Corning Corporation, Midland, Mich. under the trade designation Dow Corning 929 ("DC 929") as an emulsion having a total solids content of about 20 wt. %.

To prepare the preferred composition of this invention, the three premixed silicone emulsions are preferably combined with slow mixing (typically stirred at about 400 rpm) in the following order: first, the nonionic silicone emulsion is added to about 70 vol. % of water to form a diluted emulsion; second, the aminofunctional silicone is added with mixing; third, the amodimethicone silicone is added, and finally, water is added to make up 100% (all percentages are based on the total composition). The order of addition is important in order to form a suitable stable emulsion.

After the addition of the water is complete, p-aminobenzoic acid may be added and the combined mixture is stirred for an additional fifteen minutes and finally the combined mixture is bottled according to known methods.

Emulsion concentrations substantially outside the disclosed ranges have been found to not provide adequate finish protectants. For example, when the silicone concentrations are greater than the disclosed ranges, unwanted streaking may occur or considerable rubbing or buffing may be required to remove excess silicone to generate the desired monomolecular surface layer.

Other silicone formulations outside of the ranges described above, as illustrated in the Table, fail to provide a spray-on/wipe-off car finish protectant or do not provide the desired high gloss characteristics without polishing or buffing.

TABLE

| Ingredient/Concentration (VOL. %) | 1 | 2 | 3 | 4 | 5 | 6 | 7 | 8 | 9 | 10 | 11 | 12 | 13 |
|---|---|---|---|---|---|---|---|---|---|---|---|---|---|
| Mg. Al. Silicate | 1.0 | 0.5 | 0.5 | | | | | 0.2 | 0.1 | | | | |
| Phenyl Trimethicone | 1.0 | | | | | | | | | | | | |
| #200 Fluid Silicone | 0.3 | 1.0 | | | | | | | | | | | |
| Masil EM 250 | | | 1.0 | | | | | | | | | | |
| Dimethyl Poly-Siloxane | 2.0 | | | | | | | | | | | | |
| Dimethyl Poly-disiloxane plus trimethicone | | 0.5 | | | | | | | | | | | |
| Dow Corning 929 | 1.0 | | | 0.33 | 1.0 | | | 2.0 | 1.0 | 0.5 | 0.25 | 0.1 | 0.3 |
| Masil EM 350 | | 1.0 | 2.0 | 2.0 | 2.0 | | | 2.0 | 1.0 | 1.0 | 3.0 | 2.5 | 0.3 |
| Masil EM 115 | | | 0.5 | 0.3 | 0.5 | | | 2.0 | 1.0 | 0.5 | 1.0 | 2.5 | 0.3 |
| Masil EM 2.5 | | | 0.5 | | | | | | | | | | |
| E-677 | | | | | | 2.0 | | | | | | | |
| SWS-223 | | | | | | | 3.0 | | | | | | |
| Isopropyl Alcohol | | | | | | 3.0 | 3.0 | | | | | | |
| Water | QS | QS | QS | QS | QS | QS | QS | QS | QS | QS | QS | QS | QS |

Results of Formulation Nos. 1-13
1. Fail Shine
2. Streaks
3. Good but two wipe steps
4. Deep shine after one wipe step
5. Streaks
6. Streaks
7. Streaks
8. Too streaky
9. Runny
10. Good but thin shine
11. Good but shows finger prints
12. Streaks
13. Too thin Masil EM 2.5 - Available from Mazer Chemicals, Gurnee, IL.
Masil EM 250 - Available from Mazer Chemicals, Gurnee, IL.
E-677 - 60% active oil in water silicone emulsion, available from Wacker Silicones Corporation, Adrian, MI.
SWS-223 - 35% solids content nonionic dimethyl/silicone emulsion having a viscosity of 1,000 cSt, available from Wacker Silicones Corporation, Adrian, MI.

The results compiled in the Table are based on an empirical, subjective evaluation of an observing panel. The composition of the invention, Formula 4, provided a readily identified high-gloss, protective automobile finish. The preferred high gloss was subjectively described as a deep shine which was readily distinguishable from the other formulations that were tested.

The protective layer provided by the inventive protectant also readily sheds water and foreign materials and provides a tactile feel of being very smooth or slick, similar to the feel generally associated with waxed, treated, or polished surfaces.

The composition of this invention is preferably applied to the exterior automobile surface as a fine mist or aerosol. The wetted surface is then wiped with an absorbent cloth to ensure complete coverage of the surface, to uniformly distribute the composition, and to remove excess moisture. As the water is removed, the silicones come out of solution and form a substantive, monomolecular layer or film on the surface. The uniformity of the film contributes to the high gloss or shine of the product.

A preferred method of applying the composition to the surface uses a finger pump sprayer. In particular, the low surface tension of the silicone formulations which make up the composition allow the composition to be applied to a surface using an aerosol finger pump sprayer, LPS-15, sold by Specialty Packaging Products, Oak Ridge, Va. This finger pump sprayer delivers about 650–700 mg of the composition to a circular area of about 2.5 feet in diameter when held about 18 inches from the surface.

The foregoing detailed description is given for clarity of understanding only, and no unnecessary limitations should be understood therefrom, as modifications within the scope of the invention will be apparent to those skilled in the art.

What is claimed is:

1. An automobile finish protectant composition consisting essentially of a mixture of:
   (a) 1–2 vol. % of a nonionic polydimethylsiloxane/polyoxyethylene nonylphenol emulsion having a total solids content of about 30–40 wt. %;
   (b) 0.3–0.375 vol. % of a cationic amodimethicone/cetyl-stearyl dimethyl ammonium chloride emulsion having a total solids content of about 15–25 wt. %;
   (c) 0.3–0.35 vol. % of a cationic aminofunctional silicone/stearyl dimethylbenzyl ammonium chloride emulsion having a total solids content of about 15–25 wt. %; and
   (d) water to make 100 vol. %.

2. The automobile finish protectant of claim 1 wherein said mixture further comprises p-aminobenzoic acid in an amount effective to absorb ultraviolet radiation.

3. The automobile finish protectant of claim 1 wherein said emulsion (a) has a total solids content of about 35 wt. % and comprises about 2 vol. % of said mixture, said emulsion (b) has a total solids content of about 20 wt. % and comprises about 0.33 wt. % of said mixture, and said emulsion (c) has a total solids content of about 20 wt. % and comprises about 0.33 vol. % of said composition.

4. The automobile finish protectant of claim 3 wherein said mixture comprises about 0.2 vol. % of p-aminobenzoic acid.

5. An automobile finish protectant composition prepared by a process comprising the steps of:
   (a) adding with mixing 1–2 vol. % of a polydimethylsiloxane/polyoxyethylene nonylphenol emulsion having a total solids content of about 30–40 wt. % to an amount of water sufficient to form a diluted nonionic polydimethylsiloxane emulsion;
   (b) adding with mixing 0.3–0.35 vol. % of a cationic aminofunctional silicone/stearyl dimethylbenzyl ammonium chloride emulsion having a total solids content of about 15–25 wt. % to said diluted emulsion of (a) to form an intermediate mixture;
   (c) adding with mixing 0.3–0.35 vol. % of an amodimethicone/cetyl-stearyl dimethyl ammonium chloride emulsion having a total solids content of about 15–25 wt. % to said intermediate mixture; and,
   (d) adding with mixing water to make up 100 vol. % to provide said protectant composition, said percentages being based on the total composition.

6. The composition of claim 5 wherein said process further comprises adding p-aminobenzoic acid to said protectant composition in an amount effective to absorb ultraviolet radiation.

7. The automobile finish protectant of claim 5 wherein said emulsion (a) has a total solids content of about 35 wt. % and comprises about 2 vol. % of said composition, said emulsion (b) has a total solids content of about 20 wt. % and comprises about 0.33 wt. % of said composition, and said emulsion (c) has a total solids content of about 20 wt. % and comprises about 0.33 vol. % of said composition.

8. The automobile finish protectant of claim 7 further comprising about 0.2 vol. % of p-aminobenzoic acid.

* * * * *